United States Patent [19]

Kish et al.

[11] Patent Number: 4,706,201
[45] Date of Patent: Nov. 10, 1987

[54] AREA CUTTING METHOD

[75] Inventors: Hajimu Kish; Masaki Seki; Takashi Takegahara; Yasushi Onishi, all of Tokyo, Japan

[73] Assignee: Fanuc Ltd., Minamitsura, Japan

[21] Appl. No.: 776,205

[22] PCT Filed: Jan. 10, 1985

[86] PCT No.: PCT/JP85/00008
§ 371 Date: Sep. 9, 1985
§ 102(e) Date: Sep. 9, 1985

[87] PCT Pub. No.: WO85/03023
PCT Pub. Date: Jul. 18, 1985

[30] Foreign Application Priority Data

Jan. 10, 1984 [JP] Japan .................... 59-2520

[51] Int. Cl.[4] .................... B23C 3/00; B23H 7/20; B23Q 15/013
[52] U.S. Cl. .................................................. 364/474
[58] Field of Search ............... 364/474, 475, 168, 169, 364/170; 318/568, 569, 572

Primary Examiner—Jerry Smith
Assistant Examiner—Allen MacDonald
Attorney, Agent, or Firm—Staas & Halsey

[57] ABSTRACT

The present invention provides an area cutting method for cutting the interior of an area (AR) bounded by a closed curve (OFC'). The area cutting method includes the steps of: (1) calculating a centroid (W) of an area bounded by the closed curve; (2) determining whether each line segment (L1-L10) connecting the centroid with each vertex (P1-P10) of the area intersects the closed curve; (3) partitioning each line segment into a predetermined number of partitions if the line segment does not intersect the closed curve, and (4) performing area cutting by moving a tool along plural closed paths (CPT1, CPT2 ... ) each of which is obtained by connecting corresponding ones of the partitioning points of respective line segments. If at least one line segment intersects the closed curve, the method includes the steps of: partitioning the area (AR) into a plurality of regions; (5b) calculating the centroid of each partitioned region; (5c) partitioning each line segment connecting the centroid with each vertex of the partitioned region corresponding to the centroid into a predetermined number of partitions; (5d) finding plural closed curves, for each and every partitioned region, obtained by connecting corresponding ones of the partitioning points of the line segments; and (5e) performing area cutting by successively moving the tool along each closed path.

10 Claims, 18 Drawing Figures

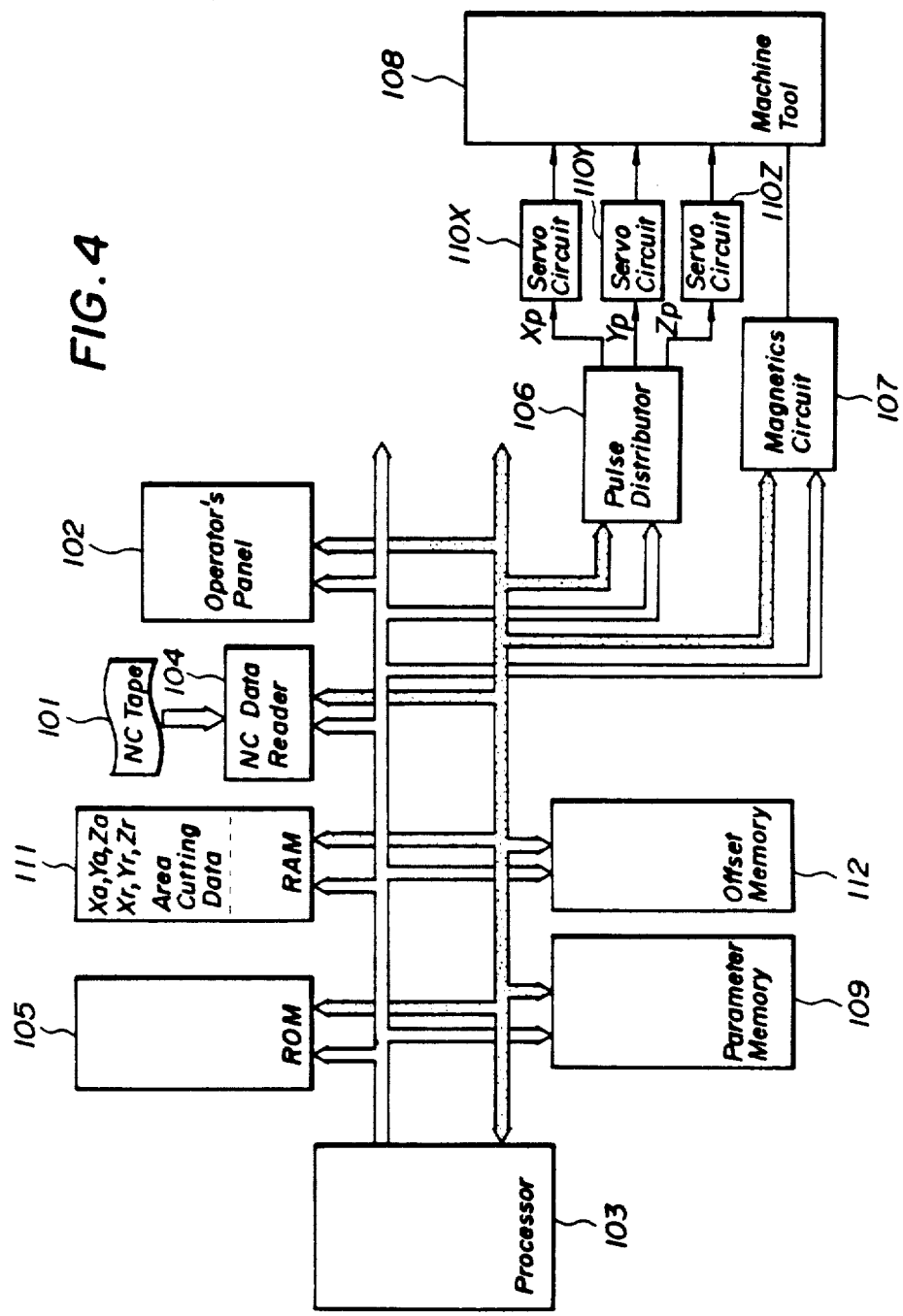

AREA CUTTING METHOD

CROSS REFERENCE TO RELATED APPLICATIONS

This application is related to U.S. application Ser. Nos. 767,797; 767,265; 768,118; 776,205, and 744,746.

BACKGROUND OF THE INVENTION

1. Field of the Invention

This invention relates to an area cutting method in a numerically controlled machine tool and, more particularly, to an area cutting method for cutting the interior of an area bounded by the curve of an external shape.

2. Description of the Related Art

Types of numerically controlled machining include cutting in which the interior of an area bounded by the curve of an external shape, for example the curve of an external shape comprising straight lines and circular arcs, is hollowed out down to a predetermined depth, and die milling in which the interior of an area is die milled. In such machining, as shown in FIG. 1(A), an area cutting method is conventionally carried out by performing cutting along an (i-1)th cutting path PTi-1 in one direction (the direction of the solid line arrow), moving the tool a predetermined amount at the completion of cutting, then positioning the tool directly above a cutting starting point Ps on the next, or i-th, cutting path PTi, thereafter lowering the tool to the cutting starting point Ps, moving the tool along the i-th cutting path PTi in the direction of the solid line arrow, and subsequently repeating the above unidirectional cutting.

Another area cutting method shown in FIG. 1(B) includes, following completion of cutting along the cutting path PTi-1 of the (i-1)th cutting path, moving the tool from a cutting end point Pe to the cutting starting point Ps on the next, or i-th, cutting path, and thereafter performing cutting along the i-th cutting path PTi. Thus, cutting is performed back and forth reciprocatively in the direction of the arrows.

Still another or third area cutting method shown in FIG. 1(C) includes obtaining offset paths OFC1, OFC2, . . . OFCn offset by predetermined amounts with respect to a curve OLC of an external shape, and moving the tool successively along the offset paths.

However, with the first area cutting method FIG. 1(A) based on unidirectional cutting, the tool must be positioned at the cutting starting point Ps on the i-th cutting path PTi after the completion of cutting along the (i-1)th cutting path PTi-1. This method is disadvantageous in that it results in a long tool travelling distance.

With the second cutting method FIG. 1(B) based on reciprocative cutting, portions are left uncut. In order to cut the uncut portions, the tool must be moved along the external shape curve OLC at completion of the back-and-forth cutting, thereby necessitating both back-and-forth cutting control and cutting control along the shape of the external curve. Accordingly, this method is disadvantageous in that the cutting control is complicated. Further, if an area AR has concavities and convexities, as shown in FIG. 1(D), the second method requires movement for achieving positioning indicated by the dashed lines. This is disadvantageous in that tool travelling distance and cutting time are prolonged. In addition, since the cutting process for the outward trip is different from the cutting process for the return trip, cutting cannot be performed efficiently overall. It should be noted that the cutting processes referred to here indicate up cutting and down cutting processes. FIGS. 2(A) and 2(B) show examples of the down cutting process, and FIGS. 2(C) and 2(D) depict examples of the up cutting process. If the workpiece material has been determined, then a cutting method capable of cutting the workpiece efficiently is selected from the up cutting and down cutting processes. However, with the second method [FIG. 1(B)], the up cutting process [e.g., FIG. 2(A)] and the down cutting process [e.g., FIG. 2(C)] are always mixed, so that cutting cannot be performed efficiently.

With the third method [FIG. 1(C)] of cutting along the offset paths, portions are left uncut at, e.g., the central portion of the area, depending upon the contour of the external shape curve. This method is disadvantageous in that dealing with these uncut portions is a complicated task.

SUMMARY OF THE INVENTION

Accordingly, an object of the present invention is to provide an area cutting method whereby the interior of an area can be cut continuously and efficiently without requiring control for raising a tool, positioning the tool at the next cutting starting point and then lowering the tool.

Another object of the present invention is to provide an area cutting method wherein portions are not left uncut.

An area cutting method for cutting the interior of an area bounded by a closed curve has a step of calculating a centroid of an area bounded by a closed curve. After calculating the centroid, a step is preformed for determining whether each line segment connecting the centroid with each vertex of the area intersects the closed curve followed by a step of partitioning each line segment into a predetermined number of partitions if the line segment does not intersect the closed curve. Next a step is executed for performing area cutting by moving a tool along plural closed paths each of which is obtained by connecting corresponding ones of the partitioning points of respective line segments. A step, which is executed if at least one line segment intersects the closed curve, is performed for partitioning the area into a plurality of regions, calculating the centroid of each partitioned region, partitioning each line segment connecting the centroid with each vertex of the partitioned region corresponding to the centroid into a predetermined number of partitions, finding plural closed curves, for each and every partitioned region, obtained by connecting corresponding ones of the partitioning points of the line segments, followed by performing area cutting by successively moving the tool along each closed path.

BRIEF DESCRIPTION OF THE DRAWINGS

FIG. 4 is a block diagram of an embodiment of the present invention;

DESCRIPTION OF THE PREFERRED EMBODIMENTS

Figure 1A:
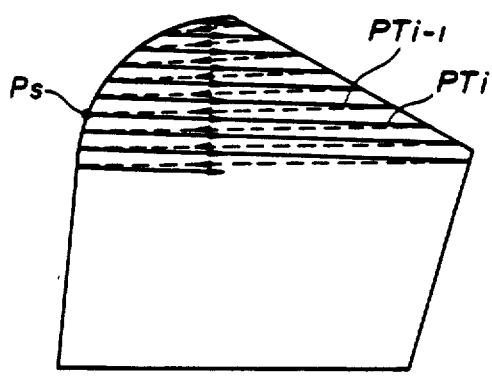
FIGS. 1(A)–1(D) are views for describing the conventional area cutting method.
Figure 1B:
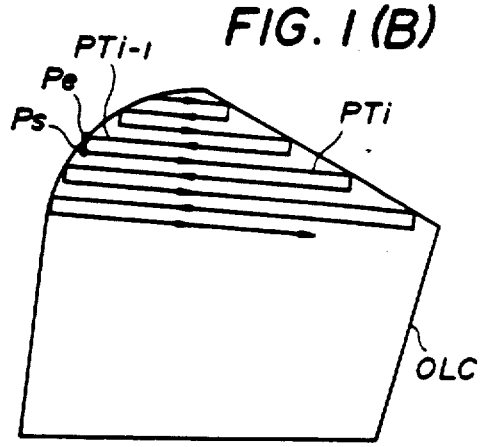
Figure 1C:
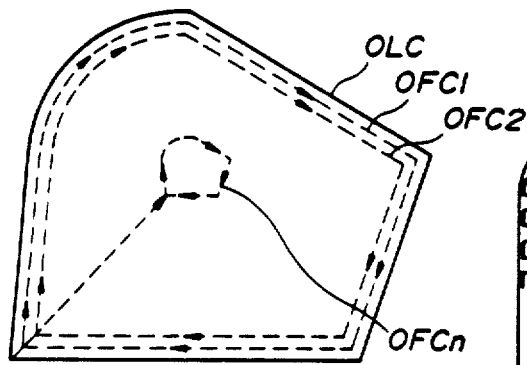
Figure 1D:
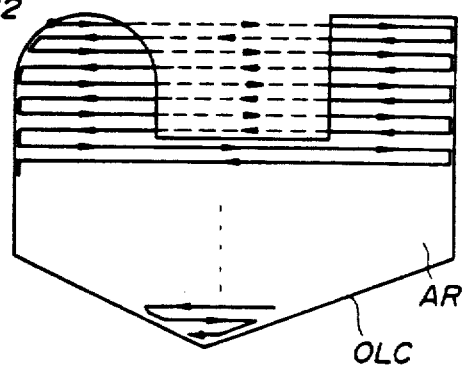
Figure 2A:
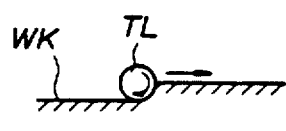
FIGS. 2(A)–2(D) are views for describing up cutting and down cutting processes.
Figure 2B:
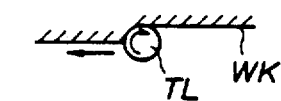
Figure 2C:
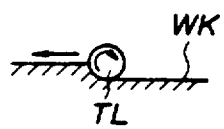
Figure 2D:
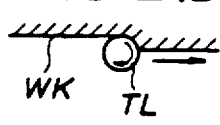
Figure 3:
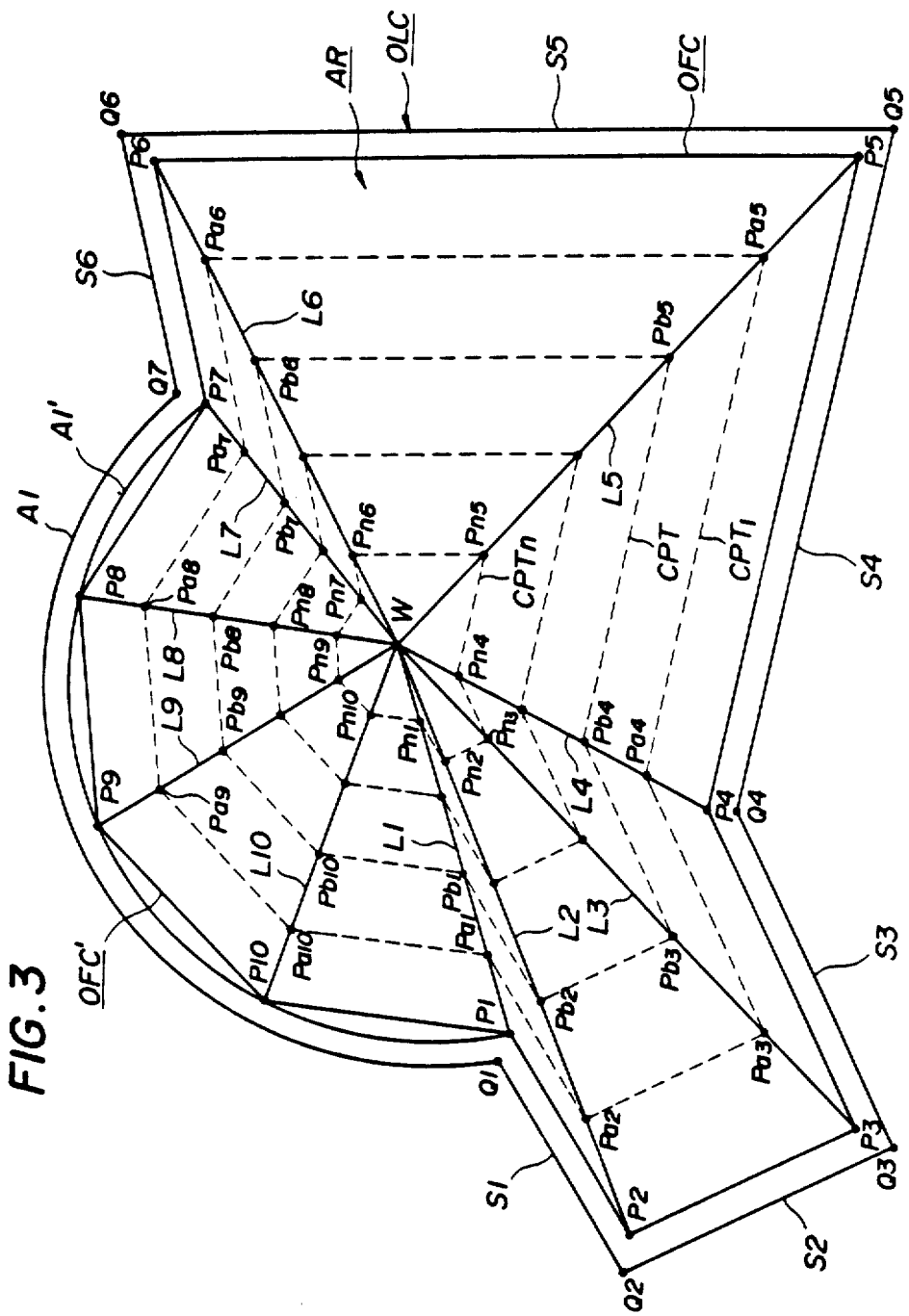
FIG. 3. is a view for describing the general features of the present invention.

FIG. 4 is a block diagram of an embodiment of the present invention, and FIG. 5 is a flowchart of processing performed thereby. The area cutting method of the present invention will now be described with reference to FIGS. 3 through 5.

Figure 5A:
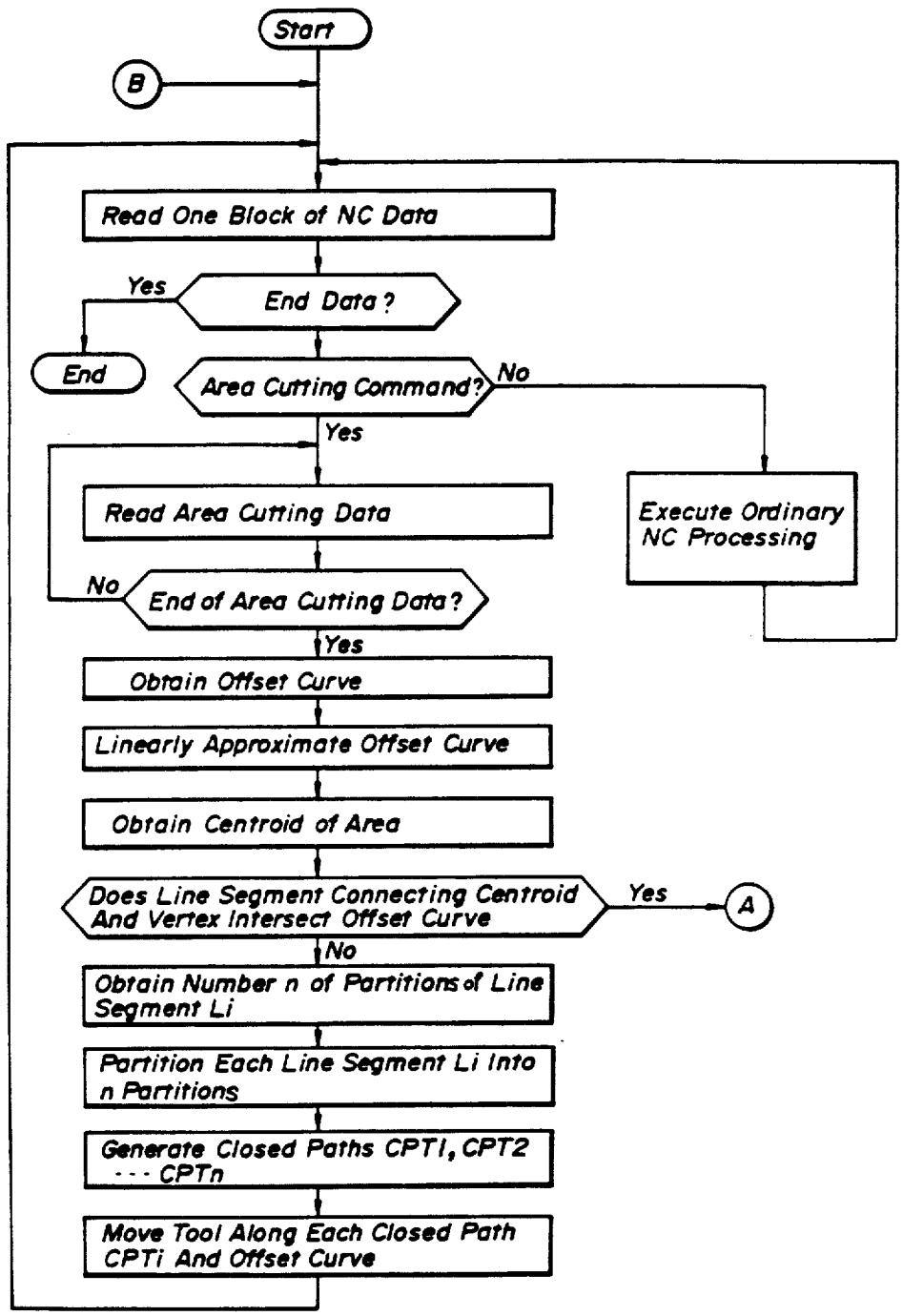
FIGS. 5(A) and 5(B) together produce a flowchart of processing indicative of the area cutting method of the present invention.
Figure 5B:
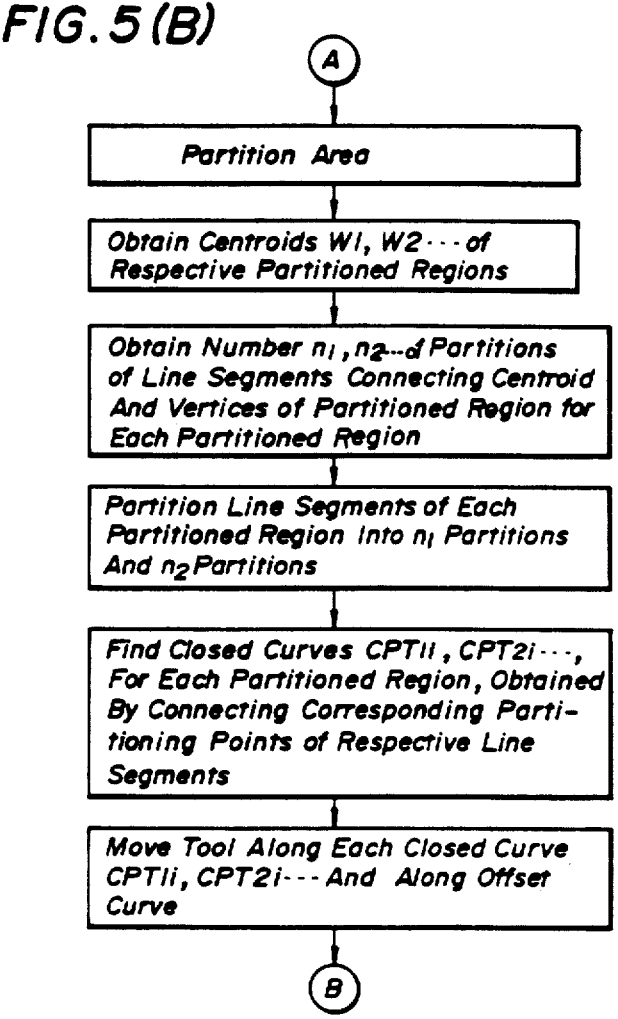

Area cutting data necessary for area cutting 13 recorded at appropriate locations on an NC tape or in a memory (assumed to be an NC tape hereafter) 101. Specifically, in addition to ordinary numerical control data, area cutting instructions, coordinate values $(x_j, y_j)$ of the vertices Q1, Q2, Q3, ... Qn of the area, the radius $r_j$ of each circular arc, finishing margin t, cut-in pitch P, cutting velocity fc, and data for identifying the end of the area cutting data, are recorded on the NC tape 101. Note that the positions of the apices and the radii of the circular arcs are commanded in sets in the form, e.g., $(x_j, y_j, r_j)$, with $r_j=0$ for straight lines. Accordingly, in the area cutting of the area AR shown in FIG. 3, the area is specified by Xx₁ Yy₁ R0;
Xx₂ Yy₂ R0;
Xx₃ Yy₃ R0;
Xx₄ Yy₄ R0;
Xx₅ Yy₅ R0;
Xx₆ Yy₆ R0;
Xx₇ Yy₇ Rr;

(1) As illustrated in FIGS. 5(A) and 5(B), when a cycle start button on an operator's panel 102 is pressed to start the system, a processor 103 causes an NC data reader 104 to read one block of NC data from an NC tape 101.

(2) Next, under the control of a control program stored in a ROM 105, the processor 103 decodes the read NC data and determines whether the NC data are indicative of program end "M02" or tape end "M30".

(3) If program end or tape end is indicated, processing is stopped. If the NC data are path data, then these data are delivered to a pulse distributor 106. If an item of NC data is an M-, S- or T-function instruction to be delivered to the machine side, then the instruction is applied to a machine tool 108 through a magnetics circuit 107. If an item of data is an area cutting instruction, then the NC data reader 104 is caused to read the area cutting data.

When an item of NC data is path data, the processor 103 finds incremental values Xi, Yi, Zi along the respective axes. The processor 103 then uses a three-dimensional command velocity F and the incremental values Xi, Yi, Zi along the respective axes to obtain velocity components $F_x$, $F_y$, $F_z$ along the respective axes from equations:

$$F_x = X_i \cdot F / \sqrt{X_i^2 + Y_i^2 + Z_i^2} \tag{1a}$$

$$F_y = Y_i \cdot F / \sqrt{X_i^2 + Y_i^2 + Z_i^2} \tag{1b}$$

$$F_z = Z_i \cdot F / \sqrt{X_i^2 + Y_i^2 + Z_i^2} \tag{1c}$$

and thereafter obtains travelling quantities $\Delta X$, $\Delta Y$, $\Delta Z$, which are to be traversed along the respective axes in a predetermined period of time $\Delta T$ seconds ($= 16$ msec), from equations:

$$\Delta X = F_x \Delta T \tag{2a}$$

$$\Delta Y = F_y \Delta T \tag{2b}$$

$$\Delta Z = F_z \Delta T \tag{2c}$$

The processor delivers $\Delta X$, $\Delta Y$, $\Delta Z$ to the pulse distributor 106 every $\Delta T$ sec. Note that $\Delta T$ is stored beforehand in a parameter memory 109.

On the basis of the input data, the pulse distributor 106 performs a simultaneous three-axis pulse distribution calculation to generate distributed pulses Xp, Yp, Zp. These are delivered to servo circuits 110X, 110Y, 110Z for the respective axes to transport the tool along the cutting path.

The processor 103, in accordance with the following formulae, updates the present position $X_a$, $Y_a$, $Z_a$ every $\Delta T$ sec, $X_a$, $Y_a$, $Z_a$ having been stored in a RAM 111:

$$X_a \pm \Delta X \rightarrow X_a \tag{3a}$$

$$Y_a \pm \Delta Y \rightarrow Y_a \tag{3b}$$

$$Z_a \pm \Delta Z \rightarrow Z_a \tag{3c}$$

The sign depends upon the direction of movement. Similarly, in accordance with the following formulae, the processor 103 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the RAM 111:

$$X_r - \Delta X \rightarrow X_r \tag{4a}$$

$$Y_r - \Delta Y \rightarrow Y_r \tag{4b}$$

$$Z_r - \Delta Z \rightarrow Z_r \tag{4c}$$

When the following condition is established or true:

$$X_r = Y_r = Z_r = 0 \tag{5}$$

the processor 103 treats this as indicating that the movable element has arrived at a target position and causes the NC data reader 104 to read the next item of NC data.

(4) If an item of NC data read from the NC tape 101 is found to be an area cutting command, the processor 103 causes the NC data reader 104 to read the area cutting data and store the data in the RAM 111 until the code indicating the end of the area cutting data is read out.

Figure 6:
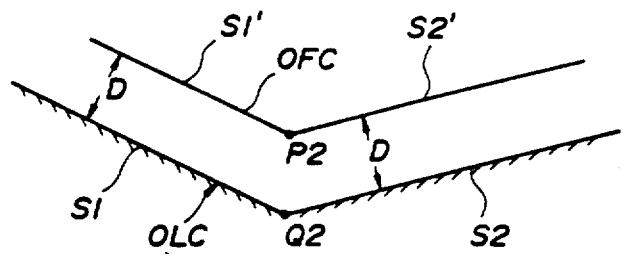
FIG. 6 is a view for describing a method of calculating an offset curve.

(5) When the reading of the area cutting data ends, the processor 103 calculates the offset curve OFC, which is offset from the curve OLC (FIG. 3) of the external shape by a distance D=ra+t, the latter being obtained by adding the tool radius ra and the finishing margin t. It should be noted that the tool radius ra is obtained by reading a radius value corresponding to a commanded tool number from an offset memory 112, which stores the correspondence between tool numbers and tool radii. The offset curve OFC is found through the following processing. Specifically, as shown in FIG. 6, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC. Accordingly, if points of intersection are found in a similar manner and stored in the RAM 111, the offset curve OFC will be obtained.

(6) The processor 103 now linearly approximates the circular arc portion of the offset curve OFC. In performing the linear approximation processing, it is so arranged that the maximum distance between the circular arc portion and the straight line takes on a value smaller than the cut-in pitch P. FIG. 7 is a view for describing the linear approximation processing.

Figure 7A:
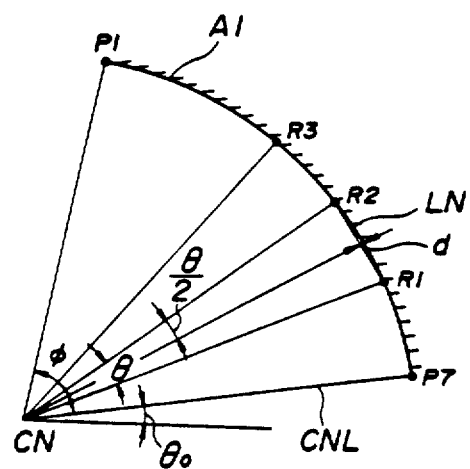
FIGS. 7(A) and 7(B) are views for describing a method of linear approximation of a circular arc curve portion.

For a case where the inner side of a circular arc A1 is the area to be cut, as shown in FIG. 7(A), the maximum distance d between the circular arc A1 and the straight line LN is given by $$d = r - r \cdot \cos(\theta/2) \quad (6)$$

where the radius of the arc is $r$ and the central angle of the line LN is $\theta$. Accordingly, the central angle $\theta$ for which $d \leq P$ holds, namely the central angle 0 that satisfies the relation:

$$\cos(\theta/2) \geq 1 - (P/r) \quad (7)$$

is found, the central angle $\phi$ of the circular arc A1 is partitioned at the angle $\theta$ and the coordinate values of each partitioning point $R_i$ are stored in the RAM 111. This ends the processing for linear approximation of the interior of the arc. If we let the coordinate values of the starting point P7 of circular arc A1 be $(x_7, y_7)$, then the coordinate values $(x_i, y_i)$ of an i-th partitioning point $R_i$, for a case where the arc center CN is taken as the origin, may be calculated from the equations:

$$x_i = x_7 \cdot \cos(i \cdot \theta) - y_7 \cdot \sin(i \cdot \theta) \quad (8a)$$

$$y_i = x_7 \cdot \sin(i \cdot \theta) + y_7 \cdot \cos(i \cdot \theta) \quad (8b)$$

Figure 7B:
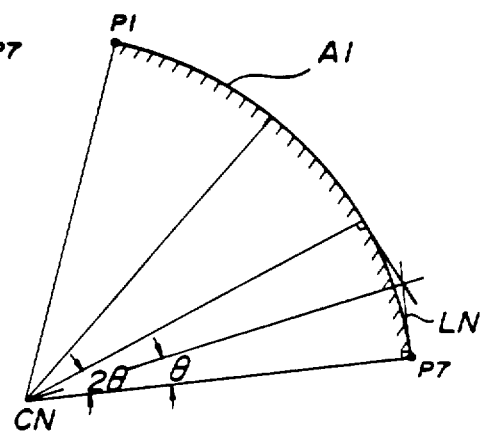

For a case where the outer side of a circular arc A1 is the area to be cut, as shown in FIG. 7(B), the maximum distance d between the circular arc A1 and the straight line LN is given by:

$$d = (r/\cos\theta) - r \quad (9)$$

Accordingly, the angle $\theta$ for which $d \leq P$ holds, namely the angle $\theta$ that satisfies the relation:

$$\cos\theta \geq r/(r+P) \quad (10)$$

is found, the point $R_i$ linearly approximating the circular arc portion on the basis of $\theta$ is found, and this is stored in the RAM 111. This ends the processing for linear approximation of the exterior of an arc.

Figure 8:
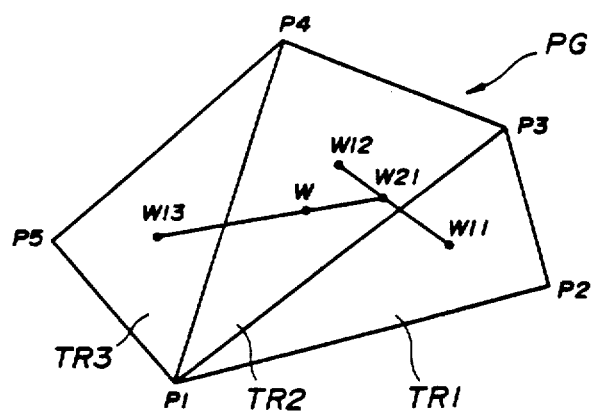
FIG. 8 is a view for describing a method of calculating a centroid.

(7) When the linear approximation processing ends, the processor 103 calculates the centroid W of an area (a polygon) bounded by an offset curve OFC' (see FIG. 3) obtained by the linear approximation. The coordinate values of the centroid of the area (polygon) are calculated through the following processing. Specifically, as shown in FIG. 8, a polygon PG is broken down into a plurality of triangles TR1 through TR3 and the centroids W11 through W13 and areas SQ1 through SQ3 of the respective triangles are calculated. Next, a point W21 that divides a line segment W12W11 connecting the centroids W11, W12 into the ratio SQ1:SQ2 (area ratio) is found. Note that the point W21 is the centroid of a quadrilateral P1P2P3P4. After the point W21 is calculated, a point W is found that divides a line segment W13W21 into the area ratio (SQ1+SQ2):SQ3. The point W is the centroid of the polygon PG.

Figure 9:
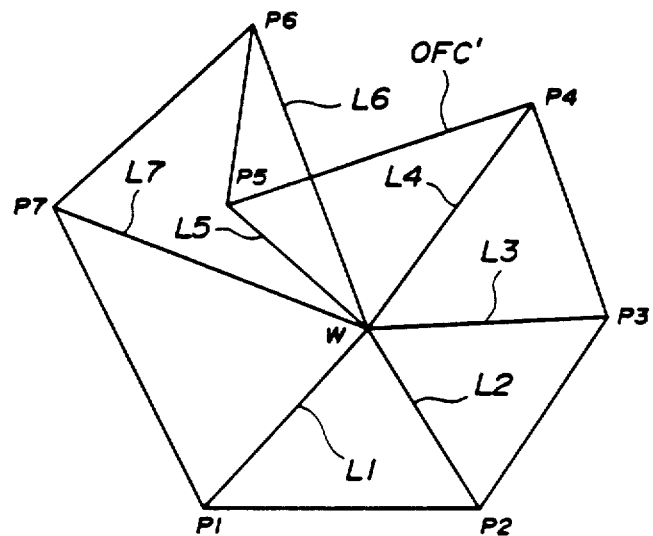
FIGS. 9(A) and 9(B) are views for describing the area cutting method of the present invention for a case where the area has a complicated shape.
Figure 9:
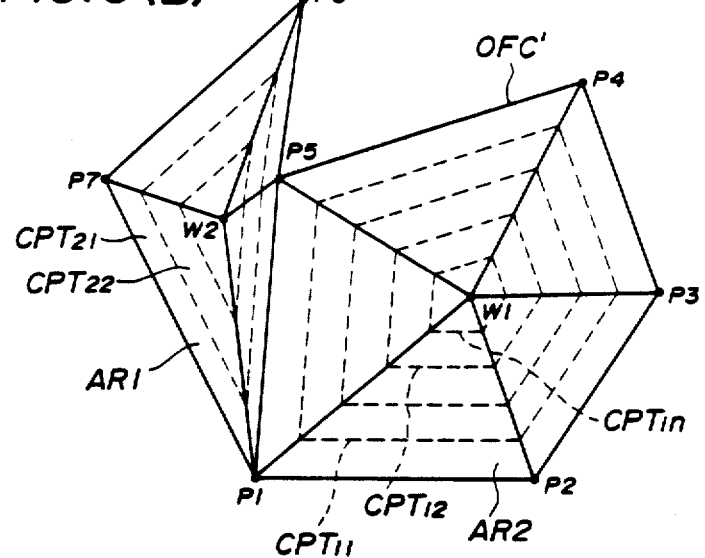

(8) When the centroid W (FIG. 3) of the area is found, the processor 103 determines whether line segments L1–L10 connecting the centroid W with each of the vertices P1-P10 of the area intersect the linearly approximated offset curve OFC'. The term "intersect" as used here refers to a state in which, as shown in FIG. 9(A), the line segment L6 connecting the centroid W with the vertex P6 of the polygon P1P2 ... P7 crosses the offset curve OFC'.

(9) If none of the line segments L1–L10 intersects the offset curve OFC', then the processor obtains, and stores in the RAM 111, the coordinate values of partitioning points:

$P_{a1}, P_{b1}, \ldots P_{n1}$;
$P_{a2}, P_{b2}, \ldots P_{n2}$;
$P_{a3}, P_{b3}, \ldots P_{n3}$;
...
$P_{a10}, P_{b10}, \ldots P_{n10}$;

that partition, into a predetermined number of partitions n, each of the line segments L1–L10. As for the number n of partitions, the length 1 of the longest of all the above-mentioned lines segments L1–L10 is found, after which an n is determined that satisfies the relation:

$$P \geq 1/n$$

(10) When the coordinate values of the partitioning points of each of the line segments are found, plural closed paths CPT1, CPT2, ... CPTn obtained by connecting the partitioning points are generated:

$P_{a1}, P_{a2}, P_{a3} \ldots P_{a10}$;
$P_{b1}, P_{b2}, P_{b3} \ldots P_{b10}$;
...
$P_{n1}, P_{n2}, P_{n3} \ldots P_{n10}$;

that correspond to each of the foregoing line segments, the tool is moved along each closed path and finally along the offset curve OFC or OFC'. The area AR can thus be cut. Accordingly, by using the coordinate values of the starting point $P_{a1}$ of the first closed path CPT1 stored in the RAM 111 through the above-described processing, the processor 103 obtains numerical data (incremental values between an initial position and the starting point $P_{a1}$) for making the tool approach the starting point $P_{a1}$ from the initial position, and thereafter executes path control based on the above-mentioned Eqs. (1a) through (5) by using the incremental values. When the approach is completed, the processor moves the tool to the point $P_{a2}$ along the first closed path CPT1 in a cutting feed mode and thereafter successively moves the tool along the first closed path in the manner $P_{a2} \rightarrow P_{a3} \rightarrow P_{a4} \ldots \rightarrow P_{a10}$ to perform cutting. When the cutting along the first closed path ends, the tool is shifted to the point $P_{b1}$ ($P_{a1} \rightarrow P_{b1}$) in the cutting feed mode and cutting is subsequently performed along the second closed path CPT2, third closed path CPT3, ... n-th closed path CPTn. Finally, the tool is moved along the offset curve OFC or OFC' in accordance with the data specifying the offset curve OFC or OFC' stored in the RAM 111. This ends the area cutting processing. Thereafter, the next item of NC data is read from the NC tape and the foregoing processing is repeated.

Though a case has been described where the tool movement sequence is CPT1→CPT2→ . . . →CPTn→OFC when performing cutting, the present invention is not limited to this sequence, for movement along the offset curve OFC (OFC') can be performed first. Further, it is possible to adopt an arrangement wherein an NC tape is prepared by the above-described method using area cutting data and the NC tape is loaded into an NC unit to cut the area.

(11) In a case where at least one of the line segments from among the line segments L1-L10 connecting the centroid with the vertices intersects the linearly approximated offset curve OFC', the area (polygon) bounded by this linearly approximated offset curve OFC' is partitioned into a plurality of regions. This area partitioning operation is carried out through the following sequence, which serves as an example [see FIG. 9(A)]:

(a) It is determined whether line segment Li connecting the centroid W with the i-th (the initial value of i is 1) vertex Pi intersects the offset curve OFC'.

(b) If no intersection occurs, the operation i+1→i is performed and the decision process of step (a) is performed.

(c) If an intersection occurs, the polygon P1P2P3 ... Pi-1 is treated as a first partitioned region $AR_1$.

(d) Thereafter, the centroid of the polygon PiPi+1 . . . P1 is found and the processing of steps (a)-(c) is repeated for the polygon PiPi+1 . . . P1.

The foregoing processing partitions the area into a plurality of regions. (In the example of FIG. 9, the area is partitioned into two regions AR1, AR2.)

(12) When the area partitioning processing ends, the centroids W1, W2 of the respective partitioned regions AR1, AR2 are obtained, processing similar to that described above is performed to obtain plural closed paths CPT11-CPT1n, CPT21-CPT2m in the respective partitioned regions AR1, AR2, and area cutting is performed by moving the tool along these closed paths.

Thus, according to the present invention, area cutting can be performed while moving a tool in a continuous manner. This eliminates wasted tool motion, raises the efficiency of cutter passes and shortens machining time.

Further, according to the present invention, the distance between i-th and (i+1)th closed paths is changed in dependence upon the shape to be cut, with the result that portions are not left uncut at the central and other parts of the area.

Still further, according to the present invention area cutting is performed in a simple manner merely by finding a centroid, partitioning straight lines connecting the centroid with the vertices of the area into a predetermined number of segments, and successively moving the tool along the closed paths connecting corresponding ones of the partitioning points.

In addition, according to the present invention, tool paths can be generated automatically merely by entering area cutting data.

The present invention is well-suited for application to area cutting performed by machine tools, or to the creation of NC data for area cutting.

What is claimed is:

1. An area cutting method for cutting the interior of an area of a workpiece bounded by a closed curve, said method comprising the steps of:
   calculating a workpiece centroid of an area bounded by said closed curve;
   determining whether each line segment connecting said workpiece centroid with each vertex of the area crosses the closed curve;
   partitioning each line segment into a predetermined number of partitions if each line segment does not cross the closed curve; and
   performing cutting of the workpiece by moving a tool along plural closed paths each of which is obtained by connecting corresponding ones of partitioning points of respective ones of said line segments.

2. An area cutting method of claim 1, further comprising the steps of:
   partitioning said area into a plurality of partitioned regions if at least one line segment crosses the closed curve;
   calculating a partitioned region centroid of each partitioned region;
   partitioning a line segment connecting the partitioned region centroid with each vertex of the corresponding partitioned region corresponding to said partitioned region centroid into a predetermined number of partitions;
   finding plural closed curves for each partitioned region, obtained by connecting corresponding ones of partitioning points of respective ones of the line segments; and
   performing cutting of the workpiece by successively moving the tool along each closed curve.

3. An area cutting method according to claim 2, wherein if a line segment connecting an i-th vertex Pi with the workpiece centroid crosses the closed curve, a region composed of vertices P1, P2, . . . Pi-1 is treated as one partitioned region.

4. An area cutting method according to claim 3, further comprising the steps of:
   determining whether each line segment connecting the partitioned region centroid of a region composed of vertices Pi, Pi+1, . . . , P1 with each vertex of the region intersects a curve of an external shape specifying the area, and
   designating said region as a partitioned region if intersection does not occur.

5. An area cutting method according to claim 1, wherein said workpiece centroid is the centroid of an area bounded by an offset curve offset a predetermined amount from a curve of an external shape specifiying the area.

6. An area cutting method according to claim 5, wherein said predetermined amount is the sum of a finishing tolerance and a cutter diameter.

7. An area cutting method according to claim 5, wherein when said offset curve includes a circular arc portion, said workpiece centroid is the centroid of an area bounded by a linearly approximated offset curve obtained by linearly approximating said circular arc portion.

8. An area cutting method according to claim 7, wherein when said circular arc portion is approximated by a straight line, the maximum distance between the circular arc portion and approximating straight line is less than a predetermined cut-in pitch.

9. An area cutting method according to claim 7, wherein said step of calculating the workpiece centroid comprises the steps of:
dividing the area bounded by said linearly approximated offset curve into plural triangles;
calculating the triangle centroids and areas of the respective triangles;
partitioning a line segment, which connects the triangle centroids of first and second neighboring triangles, by a first partitioning point at a ratio of an area of said first triangle to an area of said second triangle;
specifying said partitioning point as a quadrilateral centroid of a quadrilateral obtained by combining said first and second triangles;
partitioning a line segment, which connects the quadrilateral centroid of said quadrilateral and the triangle centroid of a third triangle, by a second partitioning point at a ratio of an area of said quadrilateral to an area of said third triangle; and
specifying said second partitioning point as a pentagon centroid of a pentagon obtained by combining said first, second and third triangles.

10. An area cutting method according to claim 1, wherein said predetermined number of partitions is determined where the length of partitioned line segments, obtained by partitioning a line segment of maximum length connecting said workpiece centroid with said vertices, is less than a predetermined cut-in pitch.

* * * * *

UNITED STATES PATENT AND TRADEMARK OFFICE
CERTIFICATE OF CORRECTION

PATENT NO. : 4,706,201
DATED : November 10, 1987
INVENTOR(S) : Kish et al.

It is certified that error appears in the above-identified patent and that said Letters Patent is hereby corrected as shown below:

```
Col. 1, line 8, delete --776,205,--;
        lines 39-40, "reciprocatively" s/b --(reciprocatively)--
Col. 2, line 59, "." s/b --;--.
Col. 3, line 19, "13" s/b --is--.
Col. 7, line 59, after "invention" insert --,--.
```

Signed and Sealed this

Fifth Day of July, 1988

*Attest:*

DONALD J. QUIGG

*Attesting Officer*   *Commissioner of Patents and Trademarks*